United States Patent
Decomps et al.

(10) Patent No.: US 6,692,020 B2
(45) Date of Patent: Feb. 17, 2004

(54) SAFETY DEVICE FOR PROTECTION OF A PASSENGER OF A MOTOR VEHICLE, COMPRISING A SEAT BELT AND ASSOCIATED INFLATABLE AIR BAG

(75) Inventors: Laure Evrard Decomps, Chaville (FR); David Quillien, Cergy Saint Christophe (FR); Laurent Oudenard, Rueil Maimaison (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/975,978

(22) Filed: Oct. 15, 2001

(65) Prior Publication Data

US 2002/0027344 A1 Mar. 7, 2002

Related U.S. Application Data

(63) Continuation of application No. 09/852,203, filed as application No. PCT/FR99/00067 on Jan. 15, 1999.

(30) Foreign Application Priority Data

Jan. 16, 1998 (FR) ............................................. 98 00455

(51) Int. Cl.⁷ ............................................... B60R 21/18
(52) U.S. Cl. .................. 280/733; 280/730.2; 280/728.2
(58) Field of Search ............................. 280/733, 730.2, 280/730.1, 728.2, 728.1

(56) References Cited

U.S. PATENT DOCUMENTS

| | | | | |
|---|---|---|---|---|
| 3,933,370 A | * | 1/1976 | Abe et al. ..................... | 280/733 |
| 4,348,037 A | * | 9/1982 | Law et al. .................... | 280/733 |
| 5,062,662 A | * | 11/1991 | Cameron ..................... | 280/733 |
| 5,162,006 A | * | 11/1992 | Yandle, II ..................... | 280/733 |
| 5,303,953 A | * | 4/1994 | Kamiyama et al. ......... | 280/733 |
| 5,333,902 A | * | 8/1994 | Hatfield ....................... | 280/733 |
| 5,597,178 A | * | 1/1997 | Hardin, Jr. ................... | 280/733 |
| 5,947,513 A | * | 9/1999 | Lehto .......................... | 280/733 |
| 6,062,596 A | * | 5/2000 | Boydston et al. ........... | 280/733 |
| 6,189,921 B1 | * | 2/2001 | Takeuchi ..................... | 280/733 |
| 6,276,715 B1 | * | 8/2001 | Takeuchi ..................... | 280/733 |

FOREIGN PATENT DOCUMENTS

JP 09188221 * 7/1997

* cited by examiner

*Primary Examiner*—Paul N. Dickson
*Assistant Examiner*—Deanna Draper
(74) *Attorney, Agent, or Firm*—Oblon, Spivak, McClelland, Maier & Neustadt, P.C.

(57) ABSTRACT

The invention relates to a safety device (12), comprising a seat belt (14) with a strap (16), an intermediate part (32, 34) of which can be in a stored position and in an operating position in which it extends along a part of the body of the passenger, and a bag (40) which can be inflated to hold back a passenger in case of collision. The bag is held by a support (42) which can be moved between a stored position and an operating position in which the support (42) and the inflated bag (40) extend along a part of the body of the passenger. The invention is characterized in that the support (42) of the inflatable bag (40) is embodied as a flexible strip which is independent of the strap (16) of the seat belt (14) and an intermediate part of which extends along a part of the body of the passenger when the airbag is in the operating position.

7 Claims, 2 Drawing Sheets

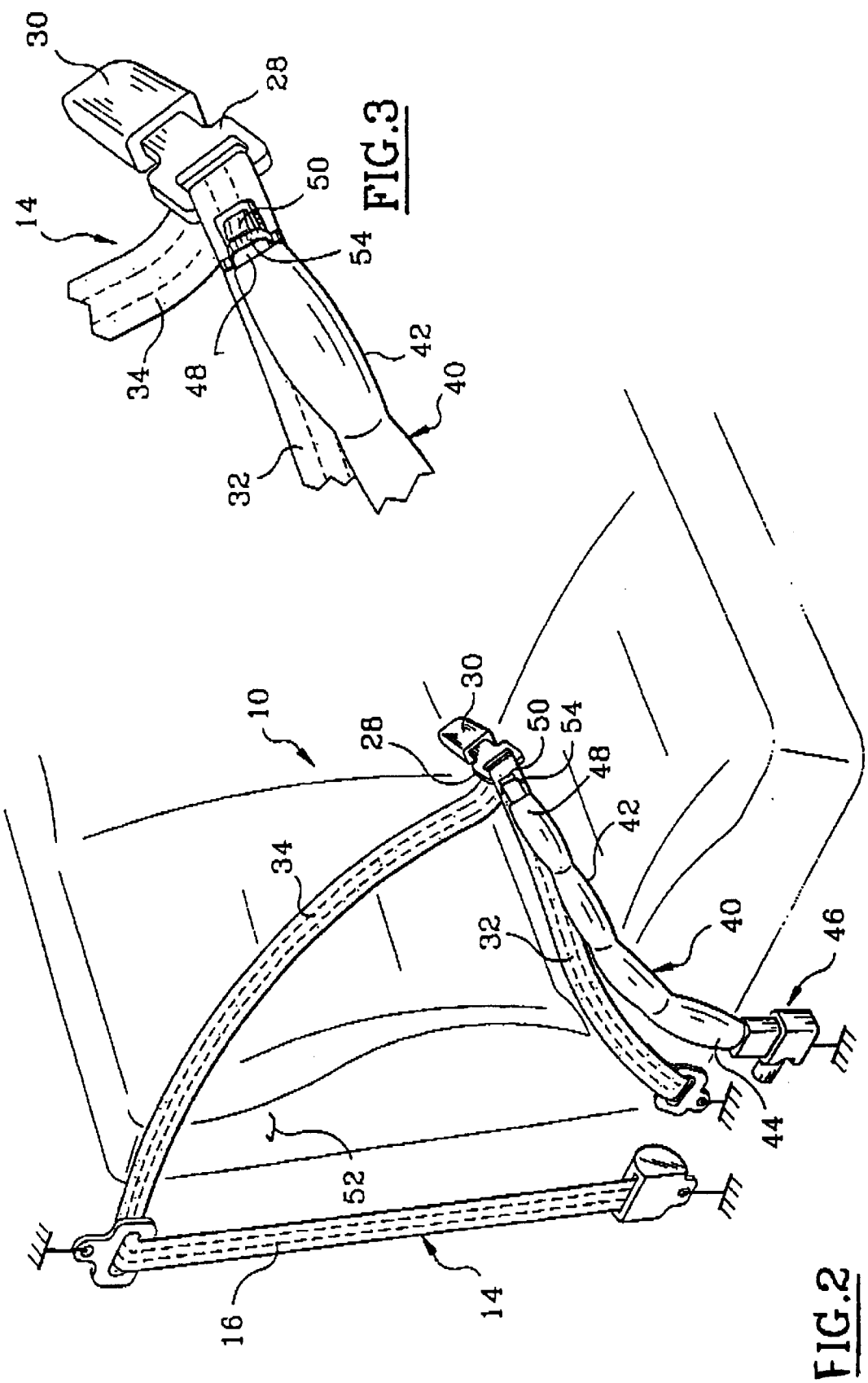

SAFETY DEVICE FOR PROTECTION OF A PASSENGER OF A MOTOR VEHICLE, COMPRISING A SEAT BELT AND ASSOCIATED INFLATABLE AIR BAG

The present invention relates to a safety device for protection of a passenger occupying a motor vehicle seat.

The invention relates more particularly to a safety device of the type comprising, in combination, a seat belt and an inflatable airbag for the possibility of frontal collision, which device is intended as equipment for a motor vehicle seat.

The association of an inflatable airbag with a seat belt has already been proposed for example in patents such as U.S. Pat. No. 5,062,662 or U.S. Pat. No. 5,597,178.

In these two patents the inflatable airbag is supported by the webbing of the seat belt, and it can be associated either with the lap loop thereof or with the diagonal or shoulder loop, in the case of a belt with three-point fixation.

Such a design makes it possible to improve protection of the passengers in the event of collision, but it does not take into account the fact that the seats are often occupied by children.

In particular, all the supplementary systems for restraining and holding children are currently held by the seat belt or, in the future, will be fixed to fixation points defined by "ISOFIX", an international standard.

The possible presence of an inflatable airbag with frontal effect makes it potentially dangerous for a child to occupy a seat, and in such a case it is absolutely necessary to provide a possibility for disabling the means for inflation of the inflatable airbag during use of systems for restraining and holding children and/or during occupation of seats by children.

A first solution comprises providing means for detecting the weight and/or height of seat occupants, but such means are complex in design, costly and not completely reliable.

In the case of vehicles equipped with fixation points according to the "ISOFIX" standard, disabling means can be associated with the fixations, but they do not resolve the problems mentioned in the foregoing for modern vehicles in which the child-restraining means are held by the seat belt.

In order to remedy these drawbacks, the invention proposes a safety device for protection of a passenger occupying a motor vehicle seat, which device is of the type comprising:

a seat belt with webbing whose two ends can be anchored to the vehicle structure and an intermediate part of which can occupy either a storage position or a use position, in which it extends along part of the passenger's body; and an inflatable airbag to restrain the passenger in the event of collision, which airbag is carried by a support which can be moved between a storage position and a use position, in which the support and the deflated airbag extend along part of the passenger's body; characterized in that the support of the inflatable airbag is a flexible strap independent of the webbing of the seat belt and an intermediate part of which, when the inflatable airbag is in use position, extends along part of the passenger's body.

According to other characteristics of the invention:

the means for inflating the airbag are disabled when the airbag is not in use position;

the support strap of the inflatable airbag is associated with means for detachable fixation thereof in use position, which means control the disabling of the inflation means;

the means for detachable fixation of the support strap of the inflatable airbag comprise a latch which is carried by the support strap and which, when the airbag is in use position, is received releasably in a catch;

the catch is fixed to the webbing of the seat belt;

the catch is fixed to the vehicle structure;

the seat belt is provided with a latch for fastening the seat belt in use position, the body of which latch is attached to the webbing and which is designed to be received releasably in a catch fixed to the vehicle structure, and the catch associated with the latch for fixation of the support strap of the inflatable airbag is associated with the body of the latch for fastening the seat belt;

when the inflatable airbag is in storage position, the fixation latch carried by the support strap is received in a catch fixed to the structure of the vehicle or seat;

when the inflatable airbag is in use position, the support strap of the inflatable airbag extends parallel to the lap loop of the webbing of the seat belt;

one of the anchor points of one of the free ends of the webbing of the seat belt is associated with a device for tensioning the webbing with a force which is adjustable at least between an upper value when the seat belt is used without the inflatable airbag and a lower value when the seat belt is used in combination with the inflatable airbag, the adjustment of the said value being automatically achieved according to whether the means for inflation of the inflatable airbag are in disabled or activated state.

Other characteristics and advantages of the invention will become apparent upon reading the detailed description which is provided hereinafter and which can be understood with reference to the attached drawings, wherein:

FIG. 2 is a view similar to that of FIG. 1 in which the seat belt and the inflatable airbag are both illustrated in use position; and FIG. 3 is a view on larger scale of a detail which represents the means for fixation of one end of the support strap of the inflatable airbag on the webbing of the seat belt.

Figure 1:
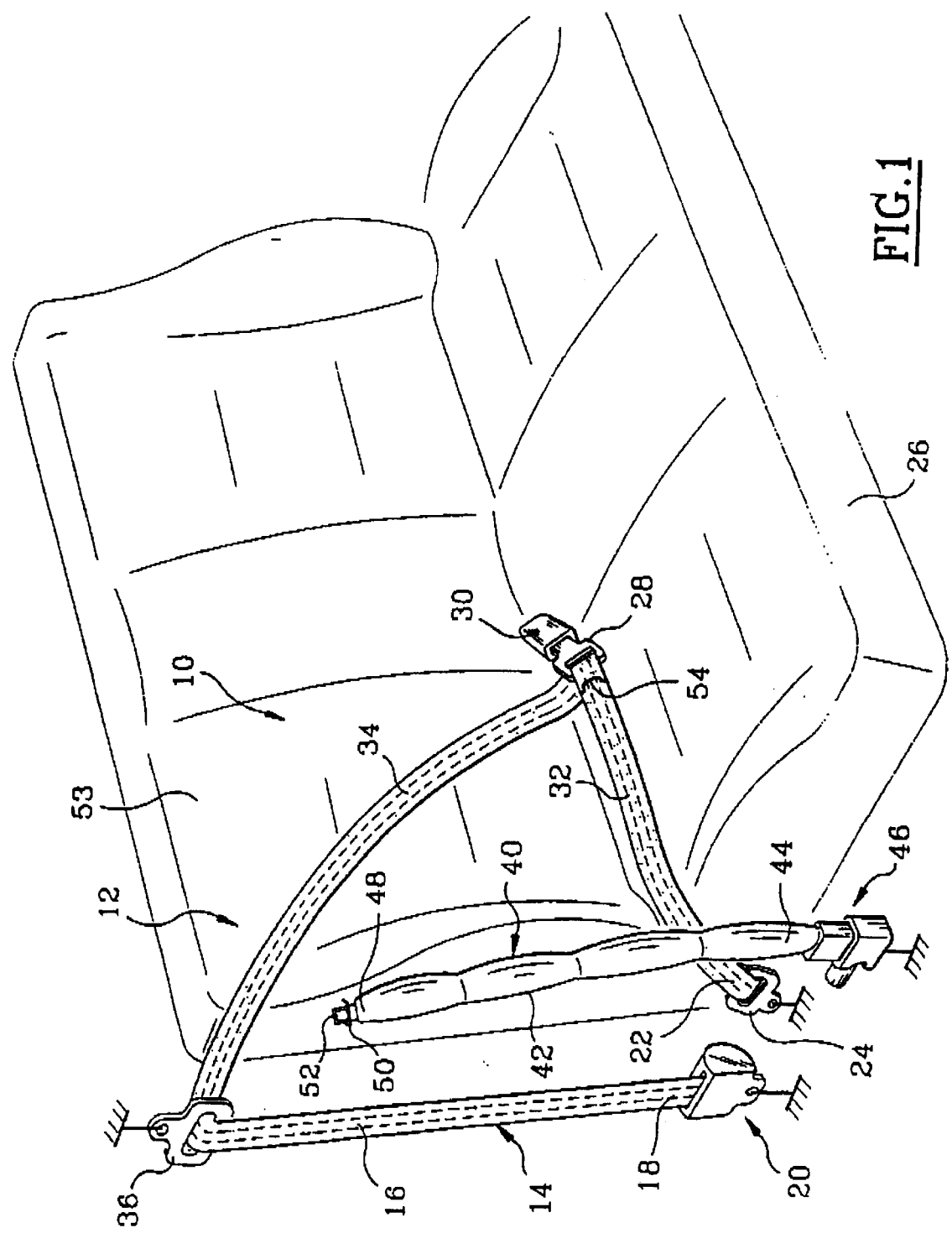
FIG. 1 is a schematic perspective view of a motor vehicle seat equipped with a safety device according to the teachings of the invention and in which the seat belt is illustrated in use position and the inflatable airbag is illustrated in storage position.

FIGS. 1 and 2 schematically illustrate a motor vehicle seat 10, in this case of the bench type, one of whose places is equipped with a safety device 12 according to the teachings of the invention.

Safety device 12 comprises in known manner a seat belt 14, which is a seat belt of standard three-point design, which is provided with webbing 16 whose first end 18 is anchored on the vehicle structure via a device 20 of known design for tensioning the belt.

The other end 22 of webbing 16 of seat belt 14 is anchored to the vehicle structure at a fixed point 24, which in this case is shown adjacent to a side face of base frame 26 of seat 10.

According to a known design, webbing 16 passes slidingly into body 28 of a belt latch which, in the use position of the belt illustrated in FIGS. 1 and 2, is received releasably in a fastening catch 30 fixed to the vehicle body structure.

By virtue of this arrangement, when the seat belt is in use position, a lap loop 32 of the belt extends substantially horizontally in front of the passenger (not shown), while a diagonally oriented vertical loop 34, also known as the shoulder loop, extends in front of the passenger's chest toward an upper diversion point 36.

According to the teachings of the invention, safety device 12 is also provided with an inflatable airbag 40 which, in the deflated condition illustrated in the figures, has the overall form of an elongated headband.

According to the teachings of the invention, inflatable airbag 40 is independent of seat belt 14.

For this purpose, inflatable airbag 40 is provided with a support strap 42, which can be an independent support element or which can be integrated with the actual structure of inflatable airbag 40, one of whose ends 44 is fixed to the vehicle structure.

Close to this end 44 there is provided a generator 46 for inflation of airbag 40, which generator, according to a known design, is automatically controlled by a circuit (not shown) for control of inflation in the event of collision.

The free end 48 of strap 42 is equipped with a fixation latch 50 which, in the storage position illustrated in FIG. 1, is received in a fixed catch 52, which in this case is shown as being attached to the structure of back 53 of seat 10. In an alternative version not shown, catch 52 can also be fixed to a structure element of the vehicle body.

In the storage position illustrated in FIG. 1, inflatable airbag 40 therefore extends substantially vertically along the lateral side of back 53 of seat 10.

In the example illustrated in the figures, inflatable airbag 40 is designed to extend, when it is in use position, substantially parallel and adjacent to the lap arm 32 of seat belt 14, or in other words in horizontal position.

For this purpose, central loop 32 of seat belt 34 is provided with a fixed catch 54, of design identical to that of catch 52, in which latch 50 can be flexibly interlocked for fixation of free end 48 of inflatable airbag 40.

According to one of the characteristics of the invention, the means for inflation of the airbag are disabled when the airbag is not in use position, or in other words when its fixation latch 50 is not engaged in fixation catch 54.

For this purpose, it is possible, for example, to provide in catch 54 a switch (not shown in the figures), which is connected to the control unit of inflation generator 46. The switch is of the normally open type, for example, and it is closed only when fixation latch 50 is in position in buckle 54. In closed condition, the switch transmits an activation signal to the control circuit of generator 46 such that, in the event of collision, the control circuit causes instantaneous inflation of inflatable airbag 40 when it is in use position.

On the other hand, when inflatable airbag 40 is not in use position and, for example, when it is in its storage position illustrated in FIG. 1, the control circuit cannot cause inflation of inflatable airbag 40.

According to another characteristic of the invention, there can be provided in the cabin (not shown in the figures) a visual sensor which indicates whether the control means for inflation of inflatable airbag 40 are in disabled or activated state.

The inflatable airbag can be equipped, in the vicinity of its free end 48, for example, with means for indicating to the users its operating status, while in particular indicating explicitly its incompatibility for use with child restraint systems such as supplementary seats and/or additional cushions.

If the place is occupied by a child, especially with additional child restraint means, the inflatable airbag must not be used and it must occupy preferably its storage position illustrated in FIG. 1, in which case the sensor then indicates visually to the users that the means for inflation of inflatable airbag 40 is in disabled state.

Such a design of course has the drawback that an adult passenger occupying the place after a child could not fix inflatable airbag 40 once again in its use position illustrated in FIGS. 2 and 3.

It is possible to remedy this drawback by automatically controlling the value of the holding force exerted by the belt by providing, for example, that adjustable means 20 for tensioning seat belt 14 has at least two levels or values of adjustment of the restraining force exerted by the belt.

Depending on whether the means for inflation of inflatable airbag 40 are in their disabled or activated state, the inflation control circuit intervenes to automatically control the value of the restraining force exerted by the belt in such a manner as to guarantee in all cases a sufficient level of safety for the passenger in the event of collision.

The invention is not limited to the embodiment which has just been described. It is possible, for example, to provide that catch 54 for fixation of free end 48 of inflatable airbag 40 in use position is attached to the vehicle structure or integrated with the body of the fastening latch of seat belt 14 in use position.

The invention also is not limited to the case in which certain of the anchor and fastening points of seat belt 14 and inflatable airbag 40 belong to the structure of the vehicle body. To the contrary, all of these points can be integrated with the seat proper and/or with a lower box frame of the seat.

The invention is applicable as safety equipment for all places of a motor vehicle, whether front or rear, and regardless of the orientation of these places.

The invention is also applicable in the case of a detachable inflatable airbag which on the whole is diagonally oriented, or in other words adjacent to loop 34 of seat belt 14.

What is claimed is:

1. A safety device for protection of a passenger occupying a motor vehicle seat, comprising:

a seat belt with webbing whose two ends can be anchored to a vehicle structure and an intermediate part occupying a storage position and a use position, in which said seat belt is adapted to extend along part of the passenger's body; and an airbag, configured to restrain the passenger, carried by a support movable between a storage position and a use position, in which the support and the airbag are adapted to extend along part of the passenger's body, wherein:

the support is a flexible strap independent of the webbing and an intermediate part of which, when the airbag is in use position, is adapted to extend along part of the passenger's body;

wherein an airbag inflation means is disabled when the airbag is not in use position;

wherein the support of the airbag comprises means for detachably fixing the support in use position, said means controlling the disabling of the airbag inflation means;

wherein the means for detachably fixing the support comprise a latch carried by the support and, when the airbag is in use position, is releasably received in a catch; and wherein when the inflatable airbag is in storage position, the means for detachably fixing the support is received in a catch fixed to the structure of the vehicle or seat.

2. A device according to claim 1, wherein the catch is fixed to the webbing.

3. A device according to claim 1, wherein the catch is fixed to the vehicle structure.

4. A device according to claim 1, wherein the seat belt comprises a latch for fastening the seat belt in use position, which is attached to the webbing and is designed to be releasably received in a catch fixed to the vehicle structure, wherein the catch associated with the latch for fixation of the support strap of the inflatable airbag is associated with the body of the latch for fastening the seat belt.

5. A device according to claim 1, wherein, when the airbag is in use position, the support extends parallel to a lap loop of the webbing of the seat belt.

6. A safety device for protection of a passenger occupying a motor vehicle seat comprising:
   a seat belt with webbing whose two ends can be anchored to a vehicle structure and an intermediate part occupying a storage position and a use position, in which said seat belt is adapted to extend along part of the passenger's body; and
   an airbag configured to restrain the passenger, carried by a support movable between a storage position and a use position, in which the support and the airbag are adapted to extend along part of the passenger's body, wherein:
      when the inflatable airbag is in storage position, the means for detachably fixing the support is received in a catch fixed to the structure of the vehicle or seat, and
      the support is a flexible strap independent of the webbing and an intermediate part of which, when the airbag is in use position, is adapted to extend along part of the passenger's body.

7. A safety device for protection of a passenger occupying a motor vehicle seat, comprising:
   a seat belt with webbing whose two ends can be anchored to a vehicle structure and an intermediate part occupying a storage position and a use position, in which said seat belt is adapted to extend along part of the passenger's body; and
   an airbag, configured to restrain the passenger, carried by a support movable between a storage position and a use position, in which the support and the airbag are adapted to extend along part of the passenger's body, wherein:
      the support is a flexible strap independent of the webbing and an intermediate part of which, when the airbag is in use position, is adapted to extend along part of the passenger's body
      wherein an airbag inflation means is disabled when the airbag is not in use position; and
      wherein an anchor point at a free end of the webbing of the seat belt is associated with a device for tensioning the webbing with a force which is adjustable at least between an upper value when the seat belt is used without the inflatable airbag and a lower value when the seat belt is used in combination with the airbag, and in that the adjustment of the said value is automatically achieved according to whether the airbag inflation means are in disabled or activated state.

* * * * *